United States Patent
Kegeler

(10) Patent No.: US 10,180,156 B2
(45) Date of Patent: Jan. 15, 2019

(54) CONNECTING ELEMENT FOR FASTENING COMPONENTS TO ROLLING-ELEMENT BEARINGS, AND ROLLING-ELEMENT BEARING ASSEMBLY

(71) Applicant: SCHAEFFLER TECHNOLOGIES AG & CO. KG, Herzogenaurach (DE)

(72) Inventor: Joerg Kegeler, Schleusingen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 15/570,839

(22) PCT Filed: May 4, 2016

(86) PCT No.: PCT/DE2016/200211
§ 371 (c)(1),
(2) Date: Oct. 31, 2017

(87) PCT Pub. No.: WO2016/180415
PCT Pub. Date: Nov. 17, 2016

(65) Prior Publication Data
US 2018/0142719 A1  May 24, 2018

(30) Foreign Application Priority Data
May 13, 2015 (DE) .................. 10 2015 208 838

(51) Int. Cl.
*F16C 33/58* (2006.01)
*F16B 21/08* (2006.01)
(Continued)

(52) U.S. Cl.
CPC .......... *F16B 21/082* (2013.01); *F16B 5/0635* (2013.01); *F16C 33/583* (2013.01); *F16C 41/00* (2013.01)

(58) Field of Classification Search
CPC ..... F16C 33/784–33/7866; F16C 41/00; F16C 33/583; F16B 5/0635; F16B 21/082
See application file for complete search history.

(56) References Cited

U.S. PATENT DOCUMENTS 3,734,583 A     5/1973  Hosnedl et al.
7,452,154 B2 *  11/2008 Aoshima ............... F16B 21/082
                                                 362/514
(Continued)

FOREIGN PATENT DOCUMENTS

DE           1056881 B      5/1959
DE      102006008731 A1     8/2007
(Continued)

OTHER PUBLICATIONS

International Search Report for International Application No. PCT/DE2016/200211 dated Sep. 19, 2016.

*Primary Examiner* — Thomas R Hannon
(74) *Attorney, Agent, or Firm* — Brooks Kushman P.C.

(57) ABSTRACT

A connecting element comprising a head and a shaft configured to fasten one or more components to a bearing ring of a rolling-element bearing, wherein the head is configured to adjust to a form of a circumferential groove in the bearing ring to be inserted in the groove, and the shaft is configured to adjust to fasten in a bore of the one or more components.

14 Claims, 1 Drawing Sheet

(51) Int. Cl.
F16B 5/06 (2006.01)
F16C 41/00 (2006.01)

(56) References Cited

U.S. PATENT DOCUMENTS

| | | |
|---|---|---|
| 8,007,183 B2 | 8/2011 | Ansorge et al. |
| 8,899,838 B2 | 12/2014 | Mola et al. |
| 9,752,617 B2* | 9/2017 | Takada .................. F16C 33/30 |
| 2012/0099811 A1* | 4/2012 | Ito .......................... F16C 35/04 |
| | | 384/448 |
| 2013/0113470 A1 | 5/2013 | Kegeler et al. |
| 2013/0301972 A1 | 11/2013 | Peng |
| 2014/0184973 A1 | 7/2014 | Barcat et al. |

FOREIGN PATENT DOCUMENTS

| | | |
|---|---|---|
| DE | 102007051475 A1 | 4/2009 |
| GB | 2411435 A | 8/2005 |
| WO | 2011134955 A2 | 11/2011 |
| WO | 2013175294 A1 | 11/2013 |

* cited by examiner

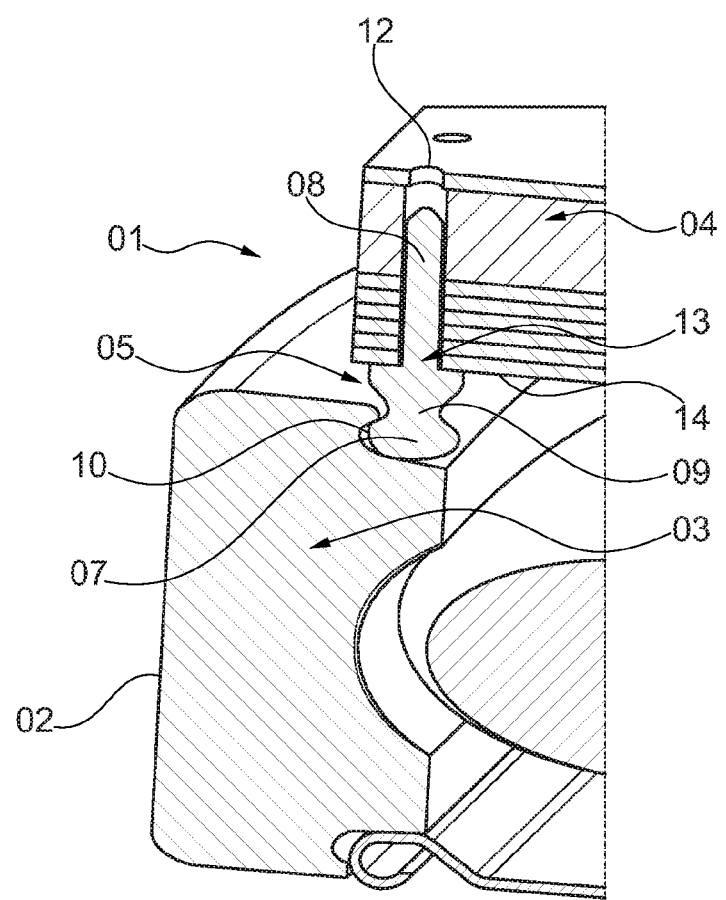

CONNECTING ELEMENT FOR FASTENING COMPONENTS TO ROLLING-ELEMENT BEARINGS, AND ROLLING-ELEMENT BEARING ASSEMBLY

CROSS-REFERENCE TO RELATED APPLICATIONS

This application is the U.S. National Phase of PCT/DE2016/200211 filed May 4, 2016, which claims priority to DE 10 2015 208 838.3 filed May 13, 2015, the entire disclosures of which are incorporated by reference herein.

TECHNICAL FIELD

The present disclosure relates to a connecting element for fastening components to rolling-element bearings, and a rolling-element bearing assembly, which may use such a connecting element.

For example, the connecting element may be used in sensor bearings or resolver bearings. According to the disclosure, sensor bearings are rolling-element bearings, which comprise integrated sensors for recording parameters of the bearing condition. Resolver bearings may involve assemblies, which may comprise a rolling-element bearing having an integrated angle sensor. By utilizing the connecting element, components may be fastened to the rolling-element bearing for implementing additional functions. The components to be fastened may involve circuit boards with implemented circuits.

BACKGROUND

WO 2011/134955 A2 shows a rolling-element bearing provided with an angle sensor, which has an inner ring and an outer ring, each of which has a circumferential groove suitable to receive a sealing ring. In the circumferential groove of the inner ring a metallic ring is fastened, which functions as measuring standard and is situated eccentrically to the rotation axis of the rolling-element bearing. A retaining element designed in the form of a plastic injection-molded part is inserted in a metal support ring, which has an outer diameter corresponding at most to the outer diameter of the rolling-element bearing. A circular gap remains between the inner diameter of the support ring and a section of the retaining element. The retaining element is fastened in the circumferential groove of the outer ring. A sensor ring designed as a printed circuit board provided to perform an angular measurement is fastened on the retaining element in such a way that it is partially located radially inside the support ring and partially radially inside the retaining ring. A ferromagnetic pot core is fastened at the assembly comprising retaining element, support ring and sensor ring.

The previously known connecting elements for fastening components to rolling-element bearings may be specific for a particular rolling-element bearing and rolling-element bearing size. Therefore, different connecting elements, respectively adjusted to each rolling-element bearing, may be required for different types and sizes of rolling-element bearings. The costs for these connecting elements may be minimal. However, the costs for producing the injection-molding tools required for manufacturing the different connecting elements may be comparatively high. This may result in a considerable expense, especially when dealing with small quantities and prototypes.

SUMMARY

An illustrative embodiment may provide a connecting element for fastening components to rolling-element bearings, which can be universally used for different types and sized of rolling-element bearings. It may be possible to produce the connecting element in a simple and cost-effective manner. Furthermore, a rolling-element bearing assembly should be provided, which has a component fastened by means of a connecting element to one of the two bearing rings.

A connecting element as described below may help achieve an objective of the disclosure.

The connecting element may comprise a head and a shaft. The head may be formed in such a way that it can be fastened in a groove of the bearing ring, and the shaft may be formed to be fastened in a bore of the component.

The connecting element may not be adjusted to one particular type or size of rolling-element bearing but it can be used in a variety of applications. For example, the groove, which should receive the head of the connecting element, may be the groove that is already available for receiving a sealing ring. In many rolling-element bearings, these grooves may have the same way cross section and only differ regarding the diameter that depends on the bearing ring. As a result, the head of the connecting element can be inserted at any circumferential position of the groove.

The adjustment to the specific nature of the respective rolling-element bearing may occur using the positioning of the bore(s) required for receiving the shaft of the connecting element in the component to be fastened. Therefore, the connecting element may have a very simple structure, thus opening a wide range of uses. The production of these connecting element results in comparatively minimal costs, because they can be produced in great quantities.

In one embodiment, the shaft of the connecting element comprises a locking element, which interacts with a locking element of the component for implementing a snap-on connection between component and connecting element. By utilizing the snap-on connection it may be possible to fasten the connecting element securely to the component. In addition, a snap-on connection may have the advantage that it can be disengaged at any time. However, the shaft may be fastened in the bore of the component in any other practical manner, for example, by using gluing, soldering or welding.

There may also be a snap-on connection between the connecting element and the groove in the bearing ring.

Between the shaft and the head, the connecting element may comprise an area with a shoulder for attaching to an outer surface of the component. By using said area, it may be possible to implement a specifically pre-determined distance between component and rolling-element. According to such an embodiment, said area is designed in the form of a truncated cone, wherein the base area of the truncated cone represents the shoulder of the connecting element attached to the component. However, this does not represent any restriction to connecting elements with a conical area. Any embodiments can be used.

According to another embodiment, the head of the connecting element may include a spherical design. Of course, it may be used in other embodiments. The head may be designed in such a way that a secure connection can be established between the groove and connecting element.

According to yet another embodiment, the connecting element may include a corrosion-resistant material. In such an embodiment, it can be ensured that the connecting element can also be used for extended periods of time under rough ambient conditions.

Furthermore, a rolling-element bearing assembly may include a rolling-element bearing with two bearing rings and a component, which is connected by using a connecting element to the rolling-element bearing, wherein the connecting element may include a head fastened in a circumferential groove of one of the two bearing rings and a shaft fastened in a bore of the component.

The rolling-element bearing assembly may include a rolling-element bearing with two bearing rings and a component, which may be fastened using a connecting element to the rolling-element bearing. The connecting element comprises a head fastened in a groove of the bearing ring and a shaft fastened in a bore of the component.

The rolling-element bearing assembly may use the connecting element so that the rolling-element bearing can be connected in a simple manner with a component having an additional function. To fasten the component to the rolling-element bearing, it may be required to insert the head of the connecting element in a groove of one of the two bearing rings. The head may be snapped in and forms a firm connection between connecting element and bearing ring. As such, this illustrative embodiment may allow for no modifications to be made on the rolling-element bearing. To fasten the head of the connecting element, it may be possible to use the groove, which may already be available for receiving a sealing ring. Furthermore, the shaft of the connecting element may be inserted in a bore previously made in the component.

The connecting element may be fastened in the bore of the component by using a snap-on connection. The bore of the component and the shaft of the connecting element may be provided with appropriate locking elements. Therefore, the connection between rolling-element bearing and component may be detached without much effort to exchange worn-out parts or provide the rolling-element bearing with other functions.

In order to fasten the component to the rolling-element bearing, the embodiment may use multiple connecting elements. Multiple bores may be distributed in the component for receiving the shaft of one respective connecting element. The heads of all connecting elements may be inserted in the same groove.

The head of the connecting element may engage in the groove of the outer ring. However, in some variations, the head of the connecting element engages with the groove of the inner ring.

The component fastened to the rolling-element bearing may involve a circuit board, which functions as carrier of components for implementing a particular additional function.

BRIEF DESCRIPTION OF THE DRAWINGS

FIG. 1 describes an embodiment of a roller bearing assembly.

DETAILED DESCRIPTION

A rolling-element bearing assembly 01 may include a rolling-element bearing 02, which may include an outer ring 03 and an inner ring (not shown). Furthermore, the rolling-element bearing assembly 01 may include a component 04, for example, a circuit board, which may be fastened using one or multiple connecting elements 05 to the outer ring 03. The connecting element 05 may be a retaining pin. It may include a spherical head 07 and a shaft 08. Between the head 07 and the shaft 08, a conical area 09 is formed, which provides a pre-determined distance between the outer ring 03 and the component 04. The head 07 engages in a circumferential groove 10 of the outer ring 03. There may be a snap-on connection between the connecting element 05 and the outer ring 03. The shaft 08 may be fastened in a bore 12 made in the component 04. The connecting element 05 and the component 04 may also be connected with each other by using a snap-on connection. Appropriate locking elements may be on the shaft 08 and the bore 12. The conical area 09 ends in a shoulder 13, which may be attached to a surface 14 of the component 04 facing the outer ring 03.

LIST OF REFERENCE NUMERALS

01 rolling-element bearing assembly
02 rolling-element bearing
03 outer ring
04 component
05 connecting element
07 head
08 shaft
09 conical area
10 groove
12 bore
13 shoulder
14 surface of the component

The invention claimed is:

1. A rolling-element bearing assembly comprising:
   a rolling-element bearing that includes at least one bearing ring having a radially-inward-facing groove of the bearing ring;
   a circuit board that includes a plurality of bores distributed along the circuit board; and
   a plurality of connecting elements, wherein each connecting element includes (1) a head fastened in the radially-inward-facing groove, wherein the head is configured to adjust to a form of the groove, (2) a shaft fastened in a bore of the circuit board, wherein the shaft is configured to adjust to fasten in the bore.

2. The rolling-element bearing assembly of claim 1, wherein the head is configured to snap into the groove of an outer ring of the at least one bearing ring.

3. The rolling-element bearing assembly of claim 1, wherein the connecting element includes a conical region between and joining the head and the shaft, wherein the conical region includes a shoulder with a flat surface abutting against a surface of the circuit board.

4. The rolling-element element bearing assembly of claim 3, wherein the conical region includes a circumferential surface between the head and shoulder.

5. The rolling-element bearing assembly of claim 1, wherein the groove is configured to receive a sealing ring.

6. An apparatus, comprising:
   a roller-element bearing including a bearing ring with a radially-inward facing groove;
   a circuit board adjacent the bearing ring; and
   a connecting element including:
   a head configured to adjust to a form of the groove; and
   a shaft connected to the head and configured to fasten the circuit board to the bearing ring, wherein the shaft is configured to adjust to fasten in a bore of a plurality of bores distributed across the circuit board; and
   a conical region between and joining the head and the shaft, wherein the conical region ends in a flat surface mating with a surface of the circuit board.

7. The apparatus of claim 6, wherein the shaft includes a locking element configured to interact with a circuit-board locking element to form a snap-on connection.

8. The apparatus of claim 6, wherein the head is configured to engage a circumferential groove of an outer ring of the roller-element bearing.

9. The apparatus of claim 6, wherein the connecting element is a retaining pin.

10. The apparatus of claim 6, wherein the connecting element includes a corrosion-resistant material.

11. The apparatus of claim 6, wherein the head includes a spherical design.

12. The apparatus of claim 6, wherein the conical region is shaped as a truncated cone with a circumferential surface adjacent the head.

13. The apparatus of claim 6, wherein the groove is configured to receive a sealing ring.

14. The apparatus of claim 6, wherein the groove of the bearing ring aligns with the plurality of bores of the circuit board.

\* \* \* \* \*